Patented Oct. 13, 1953

2,655,448

UNITED STATES PATENT OFFICE 2,655,448

DIAZOTYPE PHOTOPRINTING PROCESS

Sam C. Slifkin, Holyoke, Mass., assignor to General Aniline & Film Corporation, New York, N. Y., a corporation of Delaware No Drawing. Application March 8, 1949, Serial No. 80,324

6 Claims. (Cl. 95—88)

This invention relates to diazotype photoreproduction media and more particularly, to the use of certain monodiazo derivatives of aromatic diamines having but one diazotizable amino group as the light sensitive element of the diazotype photoprinting material.

The diazotype process, as is well known, involves the treating of a carrier or base, usually paper which may be either opaque or transparentized, or film of the cellulose ester or cellulose ether type, with a sensitizing composition containing a diazo compound as the light sensitive element. This treated base is exposed to actinic light through a pattern and a positive reproduction of the original obtained by development of the undecomposed diazo compound under the protected portions of the pattern, by means of alkaline coupling with an azo dye coupling component. The azo dye coupling component used for development of the image may be contained in an alkaline developing solution, as is the case in the so-called wet development or one-component process. In the dry development or two-component diazotype process, the sensitizing composition with which the base material is treated contains both the diazo compound and the azo coupling component. Here, the azo dye image is formed after exposure of the sensitized material by subjecting the exposed material to the action of alkaline vapors such as ammonia vapors. The diazotype photosensitive material for the two-component process must have good stability against precoupling, so that the sensitized layers may be stored for reasonable periods of time under average conditions of temperature and humidity prior to use.

The requirements of the diazotype art set rather rigid and exacting standards for the selection of the dye components to be used in the sensitizing composition for the production of a diazotype photoprinting material. The dye components must be capable of producing dyes which have good permanency and substantivity for the base material. The dyes upon development to produce the desired image must have good washfastness properties so that the image will not be blurred by bleeding of the dye into the background. They must also be fast to light and to offset. The diazo compound used in the composition as the light sensitive agent must be highly sensitive to the action of actinic light and must be particularly responsive to light from a source rich in the ultraviolet light band of from 3600 Å. to 4200 Å. as are the light sources generally employed in the printing apparatus used for diazotype reproduction. The sensitivity to light of the diazo compound must be of such an order that complete decomposition of the diazo compound is effected in the areas exposed to light to a form or product which will no longer react with a coupling component to produce an azo dye and such action must take place in a short period of exposure. The shorter the period of exposure or the faster the diazo compound is to the action of light, the more suitable it is for commercial usage. In two-component processes the sensitizing materials must also be stable to precoupling or spontaneous coupling prior to use and against oxidation. Lack of stability to precoupling and oxidation results in an overall production of discoloration in the background of the ultimate print and consequent loss of contrast between the image and the background.

In all positive photoprinting processes, particularly where final copies are being made, it is highly desirable to produce a copy which will have a distinctive color, preferably a dark shade on a clear or white background. It is also highly desirable in diazotypes that the azo dye image produced by development of the unexposed areas to azo dyes have a high degree of resistance to the attack of acid fumes. Otherwise, the dark colors which are essential to good contrast will become bleached. It has been found that the introduction of N-alkylol groups into the conventional light sensitive diazos yields dyes of a desirable brilliance of shade which are less sensitive to the attack of acid fumes than the same dyes which do not contain the alkylol substitution on the amino nitrogen. The amines from which diazo compounds of this class are derived may be represented by the formula:

wherein R is a substituent group such as alkyl, and R' is an alkyl radical.

The hydroxyalkyl or alkylol groups of this type of compound unfortunately also increase the solubility of the final dye image. Consequently, unless a coupling component is selected which will produce dyes of extreme water-resistance, the resultant image will not be sufficiently washfast to be of commercial value. Since it is not always possible to obtain a coupling component which will guarantee water-resistance in the final dye image when coupled with a diazo compound derived from one of these alkylolamines, such diazo compounds have not achieved wide use in commercial diazotypes. It has now been found that the alcohol or hydroxyalkyl group may be modified by esterification without markedly reducing the advantageous characteristics of brilliant, deep colors having a high degree of resistance to attack by acid fumes, but at the same time, considerably increasing the wash-fastness of the dyes as compared with dyes obtained from the untreated alkylolamine diazos.

Diazo compounds of the class which result from esterification of the alkylolamine diazos which are suitable for use in diazotypes have the general structural characteristics of the diazo derivatives of the p-phenylenediamines principally used in diazotype work. This class of esterified diazos may be considered as being derived by diazotization from members of the class of amines which may be represented by the following general formula:

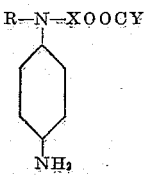

wherein R, X and Y are alkyl radicals such as methyl, ethyl, propyl, and butyl radicals.

Examples of particular amines of this class which are prepared by esterification of the corresponding alkylolamines are as follows:

1. p-Amino-N-butyl-N-carbmethoxy-ethylaniline

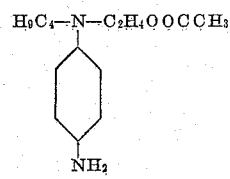

2. p - Amino - N - methyl - N - carbmethoxy - ethylaniline

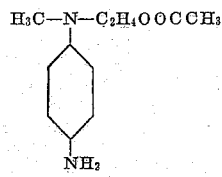

The diazo compounds derived from the amines of the foregoing class may be applied in the usual manner to any suitable support such as paper, cloth or film, such as film prepared from cellulose ethers and esters, regenerated cellulose, superpolymers and polymerization products. They may be used in any of the stabilized forms in which diazo compounds are generally recovered from the diazotization solutions prior to application to the diazotype supports. Such forms include zinc chloride, cadmium chloride, tin chloride or fluoroborate double salts, acid salts such as sulfates or chlorides of the diazo groups or the alkyl or aromatic sulfonate salts of the diazo compounds. Any compound which will function as a coupling agent and which is otherwise suitable for diazotype compositions may be employed to produce the desired shade. The coupling component may be either incorporated in the coating composition to be applied to the diazotype support with the diazo compound as a so-called two-component system or it may be used in a developing solution as the color forming developer for a so-called one-component or wet development diazotype. Examples of preferred coupling components are:

1. Sodium salt of 2-amino-8-naphthol-3,6-disulfonic acid
2. 2,3-dihydroxynaphthalene or its 6-sulfonic acid derivative
3. β-Naphthol-3,6-disulfonic acid
4. 2,7-dihydroxynaphthalene
5. 1,7-aminonaphthol
6. 2-hydroxynaphthalene-8-biguanide
7. 1-amino-8-naphthol-3,6-disulfonic acid
8. 1-naphthol-4-sulfonic acid
9. 1-naphthol-3,8-disulfonic acid
10. Phloroglucinol
11. m-Hydroxyphenylurea
12. Acetoacetanilide
13. 7-hydroxy-1,2-naphthimidazole
14. Cyclohexylacetoacetamide
15. Resorcinol
16. 4,6-dichlororesorcinol
17. 3-hydroxyphenyl biguanide
18. 4-chlororesorcinol
19. 2,8-dihydroxynaphthalene-6-sulfonic acid In producing a diazotype light sensitive layer from coating solutions containing the diazo compounds of this invention as the light sensitive agents, the base or support material is dipped, brushed or sprayed with the sensitizing or coating solution by means known to the art, the particular type of application depending upon the carrier employed. Where paper is used as the base for the light sensitive coating, the coating solution is generally applied by using a trough and doctor blade, the paper being drawn past the trough and excess solution being scraped off with the doctor blade. The paper may also be brushed or sprayed with the coating solution. When a film material is used as the support in order to obtain proper penetration of the active agents, solvents or swelling agents are added to the coating solution and the solution is generally applied by dipping. In addition to the diazo compound, coupling component and impregnating and swelling solvents, the coating solution may also contain dissolved metal salts designed to intensify the dyestuff images, such as aluminum sulfate, titanium ammonium fluoride, nickel sulfate and the like, stabilizing agents such as thiourea, thiosinamine, naphthalene trisulfonic acid and the like, acids to effect complete solubility of the solid components and assist in retarding precoupling tendencies such as citric acid, tartaric acid and boric acid and hygroscopic agents such as glycol, dextrin and the like.

Although this invention will be described with reference to the two-component or so-called dry development process, i. e., development of a diazotype layer containing both the diazo and coupling component by contacting the exposed diazotype with ammonia vapor or vapors of other volatile alkaline materials, nevertheless the invention is also applicable to the so-called one-component or moist development process in accordance with which the solution applied to the support contains as the only dye component the diazo compound of the class set forth above. In this process, as previously indicated, the coated support is exposed and the diazo compound decomposed in the exposed areas in the same manner as in the case of the two-component system, but the unexposed areas are developed by contacting the light exposed diazotype with a solution of alkaline agents containing the coupling component.

The following examples will serve to further illustrate the preparation of diazotype photoprinting materials from the diazo compounds of this invention, it being understood that the invention is not limited to the particular materials or proportions therein described. Unless otherwise specified, the parts are by weight.

*Example 1*

Diazotype paper stock is coated with a solution containing the following material per 100 cc. of water:

3 gs. p-diazo-N-butyl-N - carbmethoxy - ethyl aniline ZnCl₂ double salt

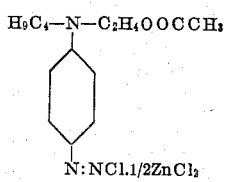

5 cc. glycol
5 gs. thiourea
5 gs. citric acid
5 gs. zinc chloride
5 gs. sodium salt of 2-naphthol-3,6-disulfonic acid (R-salt)

The thus coated paper, upon being dried and stored for long periods of time, is found to have excellent precoupling stability. When exposed to ultraviolet light under a positive original and developed with ammonia vapors, a well defined image of the original is reproduced in a bright blue color. The water-resistance or wash-fastness of the image is excellent. The fastness to diffusion and light fastness of the image are also good.

*Example 2*

Diazotype paper stock is coated with a solution containing the following material per 100 cc. of water:

3. gs. p-diazo-N-methyl-N-carbmethoxy ethylaniline ZnCl₂ double salt

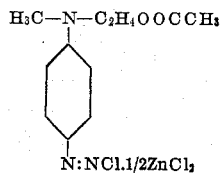

5 cc. glycol
5 gs. thiourea
5 gs. citric acid
5 gs. zinc chloride
5 gs. 2,3-dihydroxynaphthalene-6-sulfonic acid The thus coated paper, upon being dried and stored for long periods of time, is found to have excellent precoupling stability. When exposed to ultraviolet light under a positive original and developed with ammonia vapors, a well defined image of the original is reproduced in a bright blue color. This image has excellent water and wash-fastness properties and also has good properties of fastness to diffusion and light.

I claim:

1. A process of producing photoprints containing azo dyestuff images which comprises exposing under a pattern to rays of ultraviolet light-sensitive material comprising a base having thereon a light-sensitive layer containing a light-sensitive monodiazo derivative of an aromatic diamine having the general formula:

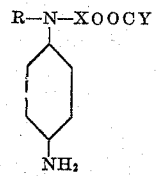

wherein R, X and Y are alkyl radicals, to effect decomposition of the light-sensitive monodiazo compound where exposed, and developing the light-sensitive material by means of an alkali in the presence of an azo dye coupling component to effect coupling between the undecomposed monodiazo compound and said coupling component.

2. The process as defined in claim 1, wherein the azo dye coupling component is present in the light-sensitive layer.

3. The process as defined in claim 1, wherein the light-sensitive monodiazo derivative is of p-amino-N-butyl-N-carbmethoxy ethylaniline, and wherein the azo dye coupling component is present in the light-sensitive layer.

4. The process as defined in claim 1, wherein the light-sensitive monodiazo derivative is of p-amino-N-methyl-N-carbmethoxy ethylaniline, and wherein the azo dye coupling component is present in the light-sensitive layer.

5. The process as defined in claim 1, wherein the light-sensitive monodiazo derivative is of p-amino-N-butyl-N-carbmethoxy ethylaniline, and wherein the azo dye coupling component is the sodium salt of 2-naphthol-3,6-disulfonic acid.

6. The process as defined in claim 1, wherein the light-sensitive monodiazo derivative is of p-amino-N-methyl-N-carbmethoxy ethylaniline, and wherein the azo dye coupling component is 2,3-dihydroxynaphthalene-6-sulfonic acid.

SAM C. SLIFKIN.

References Cited in the file of this patent

UNITED STATES PATENTS

| Number | Name | Date |
| --- | --- | --- |
| 2,045,324 | Felix et al. | June 23, 1936 |
| 2,336,309 | Snell et al. | Dec. 7, 1943 |

OTHER REFERENCES

Diserens, The Chemical Technology of Dyeing and Printing (published by Rheinhold Pub. Corp., New York, N. Y., 1948, p. 263–264).